Feb. 1, 1955

H. S. HARRISON 2,701,048

CONVEYER FEED MECHANISM

Filed Jan. 11, 1950

INVENTOR.
HOMER S. HARRISON
BY
ATTORNEYS

Feb. 1, 1955  H. S. HARRISON  2,701,048
CONVEYER FEED MECHANISM
Filed Jan. 11, 1950  3 Sheets-Sheet 2

INVENTOR.
HOMER S. HARRISON
BY
ATTORNEYS

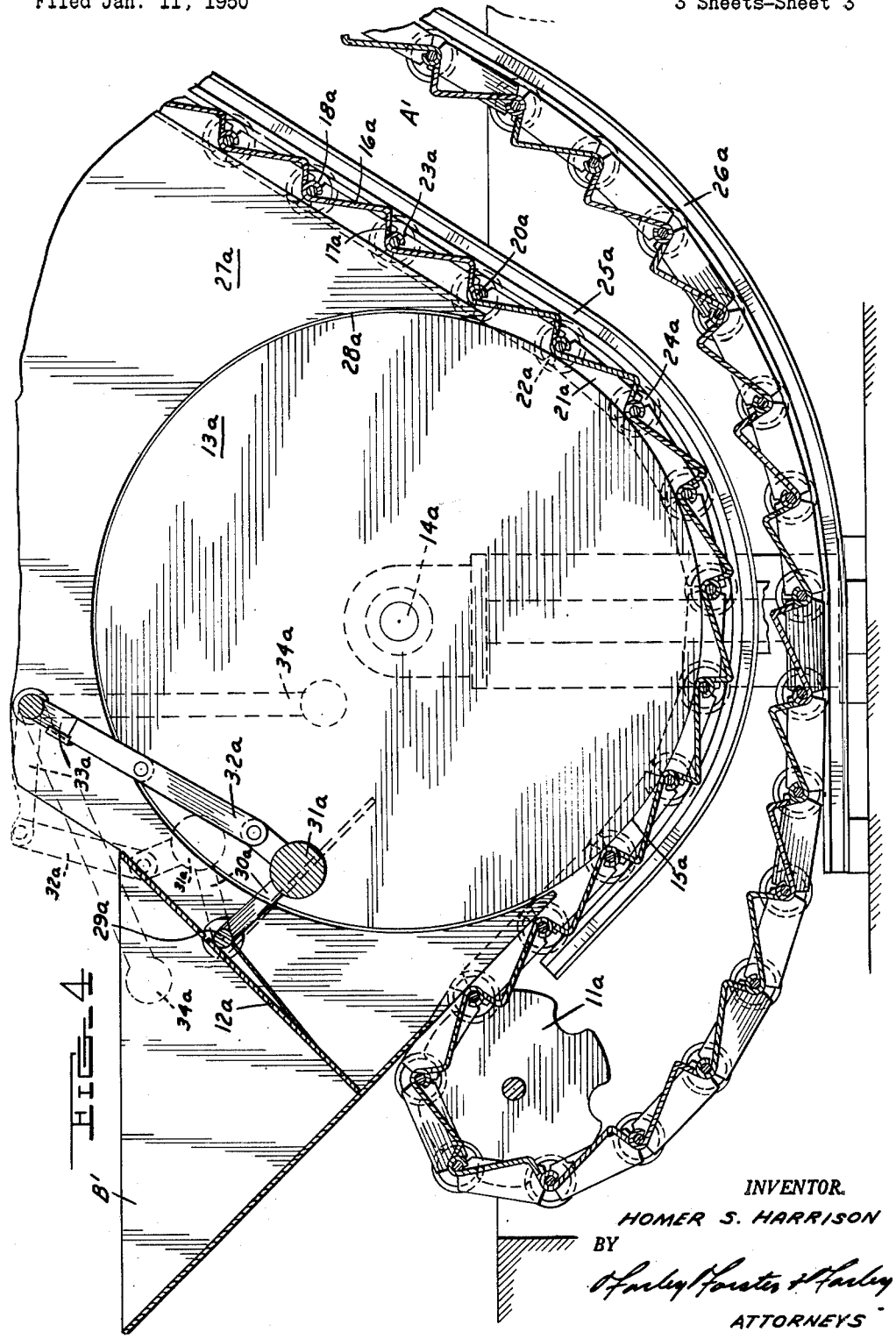

United States Patent Office 2,701,048
Patented Feb. 1, 1955

2,701,048

CONVEYER FEED MECHANISM

Homer S. Harrison, Detroit, Mich., assignor to Allied Steel and Conveyors, Inc., Detroit, Mich., a corporation of Michigan Application January 11, 1950, Serial No. 138,020

3 Claims. (Cl. 198—53)

This invention relates to a conveyor mechanism for feeding irregular objects intermittently loaded into a hopper at a substantially uniform rate.

The particular problem giving rise to the present invention was the requirement in an automotive parts plant for feeding rough forgings of various irregular shapes into a shot blast machine. Such forgings are ordinarily loaded from the forging presses into gondola boxes periodically moved by lift trucks to the shot blast operation. While a precisely uniform rate of feed into the shot blast machine was not required, an entire load of forgings could not be handled by the machine at one time and some method of gradual feed was necessary.

Various types of restricted opening hoppers have been tried with limited success due to the packing action of the forgings making it necessary to continually dislodge the jammed parts. This resulted in damage to the forgings besides requiring the constant attention of an operator and, because a load of forgings represented a high order of weight, it was frequently extremely difficult to dislodge those forgings holding up the flow. Furthermore, since a wide variety of forgings had to be handled, it was impossible to provide a suitable hopper opening.

While it is characteristic of the forgings in question to pack in a manner preventing flow through a limited opening, they are not of such character as to tangle— that is, they are free of any tendency to interlock and hang together.

The present invention, in contradistinction to prior attempts at feeds through limited openings, treats a load of forgings as a rotating mass from which a layer at a time can be withdrawn by suitable drag means.

Accordingly, it is the principal object of the present invention to provide a conveyor mechanism adapted to gradually feed irregular articles, such as rough forgings, away from a load or mass of such articles.

Another object is to provide a mechanism capable of gradually feeding articles having a variety of different sizes and shapes.

Another object is to accomplish such gradual feed by rotating a load of the articles as a mass and progressively removing the outer layer from the surface of such mass.

Another object is to employ a continuous conveyor to accomplish both the rotation of the mass and to drag off the outer layer of articles.

Another object is to employ an inclined slope in the conveyor to insure single layer delivery by returning any excess articles back to the rotating mass.

Another object is to employ a hopper with a trap door for holding an extra load while one load is being gradually fed by said conveyor.

Another object is to employ a toggle mechanism for holding the trap door shut with the weight of a load adapted to open said door upon a slight displacement of the toggle linkage together with a counterweight adapted to close and lock the trap door upon the emptying of the hopper.

These and other objects will become more apparent from the following description of two particular embodiments of my invention and from an examination of the drawings forming a part hereof, wherein Fig. 1 is a sectional side elevation of a machine embodying my invention taken along the line 1—1 of Fig. 2;

Fig. 3 is an enlarged fragmentary sectional view showing the construction of the conveyor links; and Fig. 4 is a fragmentary sectional view similar to Fig. 1 showing a somewhat modified arrangement of hopper location.

Figure 1:
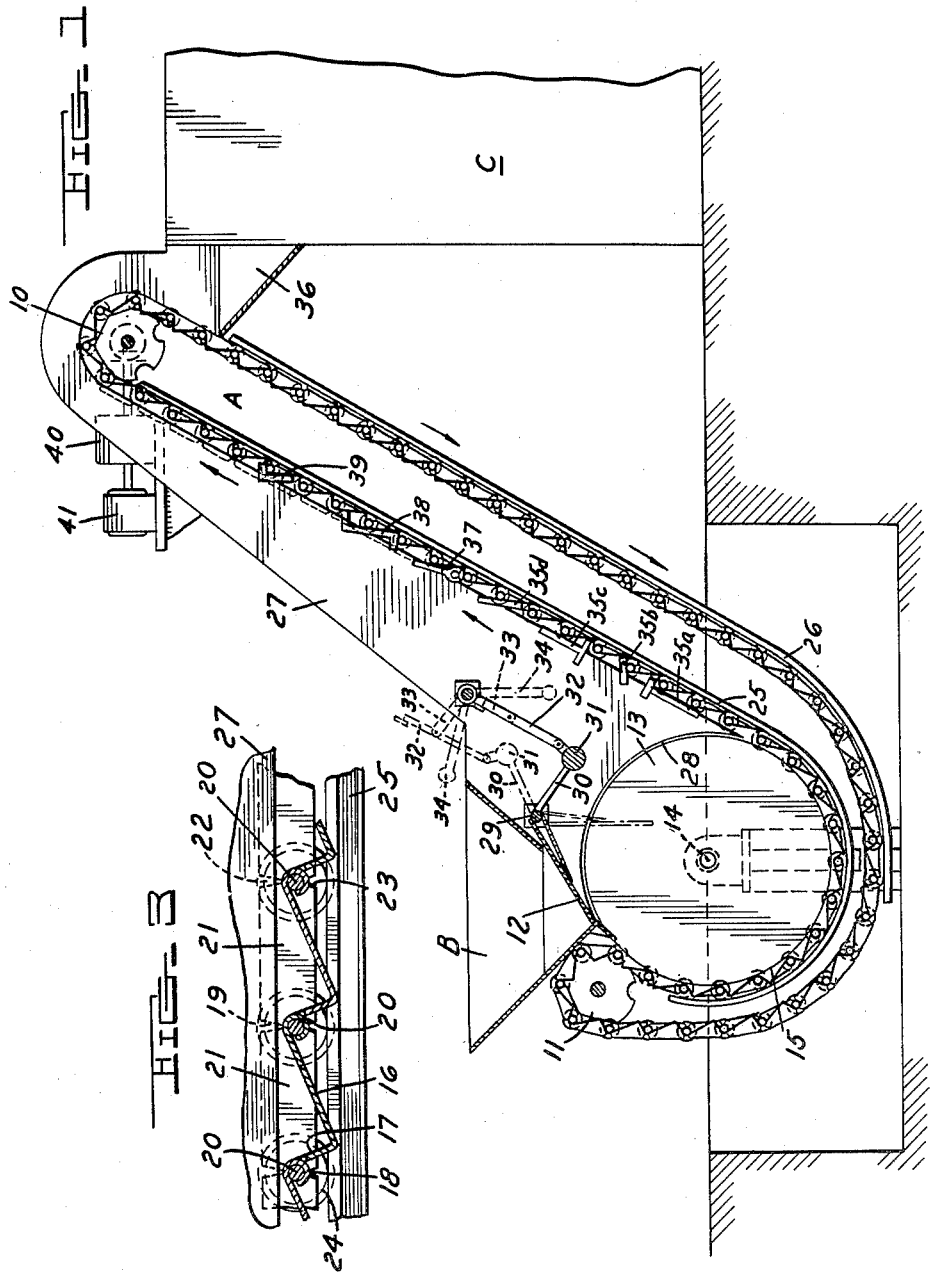
Figure 2:
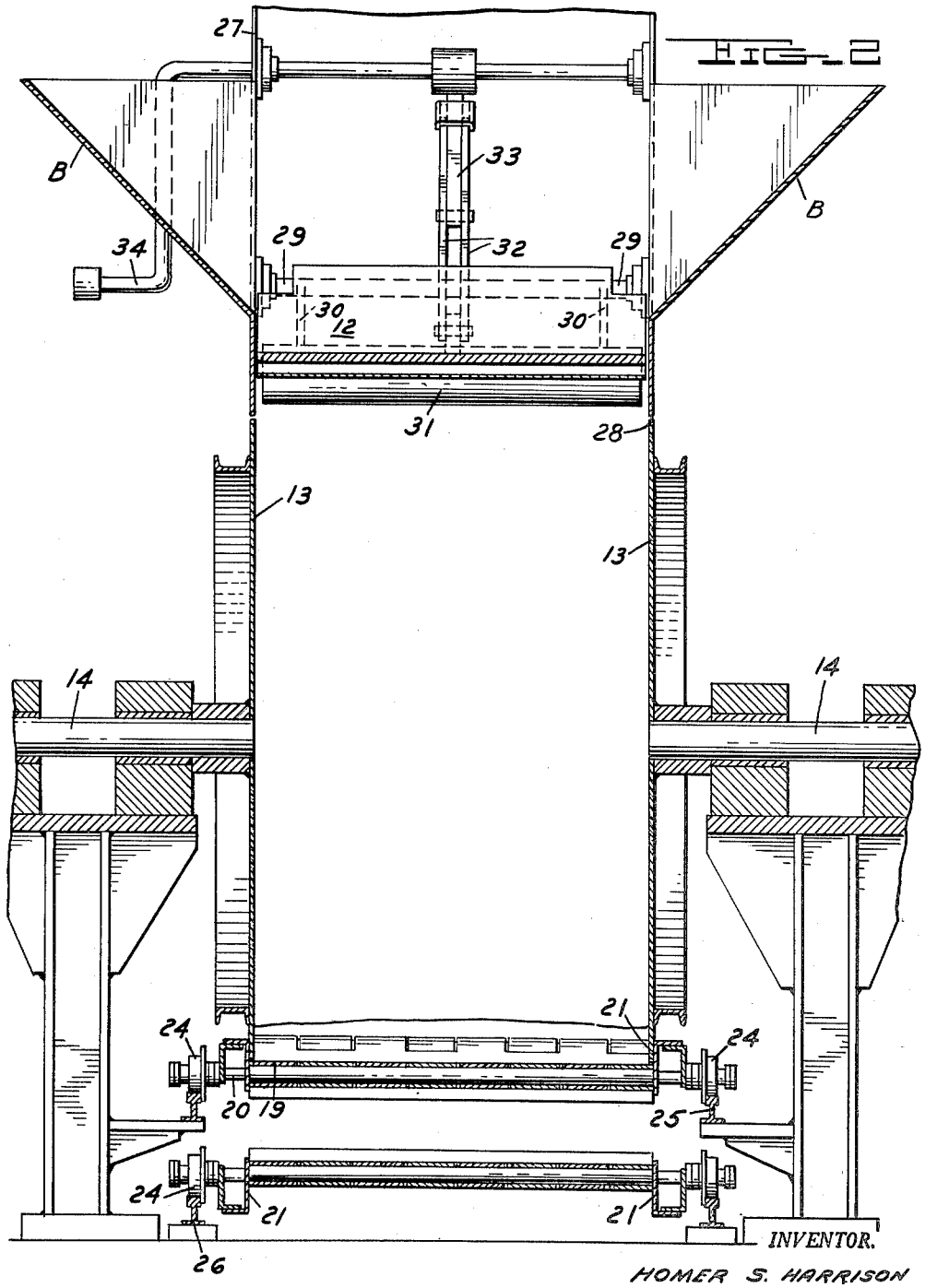
Fig. 2 is an end elevation taken along the line 2—2 of Fig. 1.

Referring to Fig. 1, it will be seen that a continuous conveyor A passes around a drive sprocket 10 and an idler sprocket 11 and that the lower end of the upper surface is adapted to follow a semicircular path forming a receiving pocket for a load of forgings. The hopper B is positioned above the conveyor and is provided with a trap door 12 adapted to dump a load of forgings into the conveyor pocket. A pair of circular side plates 13 are journaled on stub shafts 14, as shown in Fig 2, to rotate freely with their lower edges 15 adapted to define the path of travel of the pocket-forming surface of the conveyor A and to rotate with such surface.

As shown in Fig. 3, the conveyor is constructed with an apron type belt having bottom pan members 16 extending across the width of the conveyor formed with a trough 17 and having rearward and forward ends 18 and 19 formed to hinge on cross shafts 20 with spaced segments of adjacent ends adapted to alternately engage the drive shaft in the manner of a door or piano hinge. The bottom pan members 16 are joined on either side to side apron members 21 which are in alignment and spaced apart above and below the cross shaft as shown at 22 and 23 to permit articulation in either direction as required in passing around sprockets 10 and 11 and the circular plates 13.

The cross shafts 20 extend through the apron members 21 on either side and provide axles for flanged roller wheels 24 which move on upper and lower guide rails 25 and 26 serving, with the side plates 13 and sprockets 10 and 11, to establish the path of the conveyor A. The rollers 24 also serve to engage the sprocket members 10 and 11.

Fixed side plates 27 extend up on either side of the conveyor and are provided with arcuate lower ends 28 which extend to a position of close proximity with the perimeter of the rotatable plates 13. The fixed side walls 27 are also joined at their lower ends with the side walls of the hopper B providing a unitary structure therewith.

The trap door 12 is hinged at 29 and is provided with an actuating lever arm 30 having a weight 31 adapted to move the trap door 12 to a closed position. A pair of toggle arms 32 and 33 are adapted to hold the lever arm 30 and trap door 12 in closed position against the weight of a load of forgings in the hopper B, but upon breaking the toggle arms with the handle 34, the weight of the load of forgings is sufficient to open the trap door to the dotted line position against counterweight 31. After a load of forgings has passed from the hopper B into the pocket formed by the conveyor A, the counterweight 31 will again return the trap door 12 to a closed position and the toggle links 32 and 33 will automatically lock the door in such position.

When the conveyor A is in operation with a load of forgings in the pocket, such forgings will be caused to rotate as a mass in a counterclockwise direction as seen in Fig. 1 due to the movement of the conveyor and side walls 13. As the forgings rotate, the irregular surface of the conveyor provided by the pan members 16 will serve to drag a portion of the outer layer of the rotating mass up the steeply inclined surface of the conveyor. As illustrated by the various positions, $a$, $b$, $c$ and $d$ of a typical forging 35, there are numerous ways in which the surface of the conveyor may engage the forgings and drag them away from the rotating mass up the inclined surface. It will also be understood that the steep inclination of the conveyor will cause any excess of forgings over a single layer to tumble back onto the rotating mass so that substantially only a single layer or less will be held by the surface of the conveyor up to the top and over the sprocket 10 where they will fall into the chute 36 of the shot blast machine C.

Forgings 37, 38 and 39 illustrate a few of the other of a wide variety of forging shapes and forms capable of being handled by the single form of conveyor pan 16. While in practice only a single type of forging will be handled by the conveyor at one time, the various types of forgings may be handled in successive loads without any change in the conveyor. Of course, in meeting the requirements of any particular plant, a conveyor surface would be provided which would handle all or as many as possible of the various forms and shapes to be processed. While the various types of forgings to be handled may be engaged by the surface of the conveyor with greater or less frequency, adjustment in the speed of feed for each type may be readily made by adjustment in the speed of conveyor travel, for example, by the variable speed reduction unit 40 for the motor drive 41.

Thus it is seen that a gradual feed conveyor has been provided which is flexible to numerous requirements in the handling of irregular objects such as rough forgings.

In Fig. 4, a modified arrangement of the hopper position is shown which serves the double purpose of facilitating loading from a lower level and providing less shock to the parts and conveyor upon opening the hopper door 12a to permit a load of forgings to enter the conveyor pocket. In other respects, the construction and operation of this modified form is identical to the embodiment of Figs. 1 to 3.

While two constructional embodiments have been illustrated and described in detail in connection with their application to a specific requirement, it will be understood that modifications in design and adaptation might be resorted to without departing from the scope of my invention as defined in the following claims.

I claim:

1. A gradual feed mechanism for a load of irregular articles of the class described characterized by a continuous conveyor having its upper surface formed as a pocket for receiving said load, and rotatable side members, the lower edges of which are adapted to move with the surface of said conveyor forming said pocket in order to facilitate the rotational movement of said load as a mass.

2. A gradual feed mechanism for a load of articles characterized by a continuous apron conveyor having bottom pan members formed with an irregular surface, the path of said conveyor being adapted to form a pocket for receiving a load of said articles and adapted upon movement to rotate said load as a mass, the irregular surface of said bottom pan members being adapted to engage articles on the outer surface of said mass and deliver them at a gradual rate, and rotatable side members, the lower edges of which are adapted to move with the surface of said conveyor forming said pocket in order to facilitate the rotational movement of said mass.

3. A gradual feed mechanism for a load of articles characterized by a continuous apron conveyor having bottom pan members formed with an irregular surface, the path of said conveyor being adapted to form a pocket for receiving a load of said articles and adapted upon movement to rotate said load as a mass, the irregular surface of said bottom pan members being adapted to engage articles on the outer surface of said mass and deliver them at a gradual rate, the path of said conveyor leading away from said rotating mass at a relatively steep angle adapted to cause articles in excess of a single layer on said conveyor surface to fall back onto said rotating mass, and rotatable side members, the lower edges of which are adapted to move with the surface of said conveyor forming said pocket in order to facilitate the rotational movement of said mass.

References Cited in the file of this patent

UNITED STATES PATENTS

| Number | Name | Date |
|---|---|---|
| 823,436 | Oyer | June 12, 1906 |
| 854,734 | Haines | May 28, 1907 |
| 955,193 | Paulitsch | Apr. 19, 1910 |
| 1,496,080 | Alderman | June 3, 1924 |
| 2,126,425 | Thompson | Aug. 9, 1938 |
| 2,209,340 | Landry | July 30, 1940 |
| 2,538,242 | Hannon | Jan. 16, 1951 |

FOREIGN PATENTS

| Number | Country | Date |
|---|---|---|
| 636,381 | Germany | Oct. 7, 1936 |